Oct. 5, 1948.  H. A. FLOGAUS  2,450,506
VEHICLE SUSPENSION
Filed July 27, 1943  2 Sheets-Sheet 1
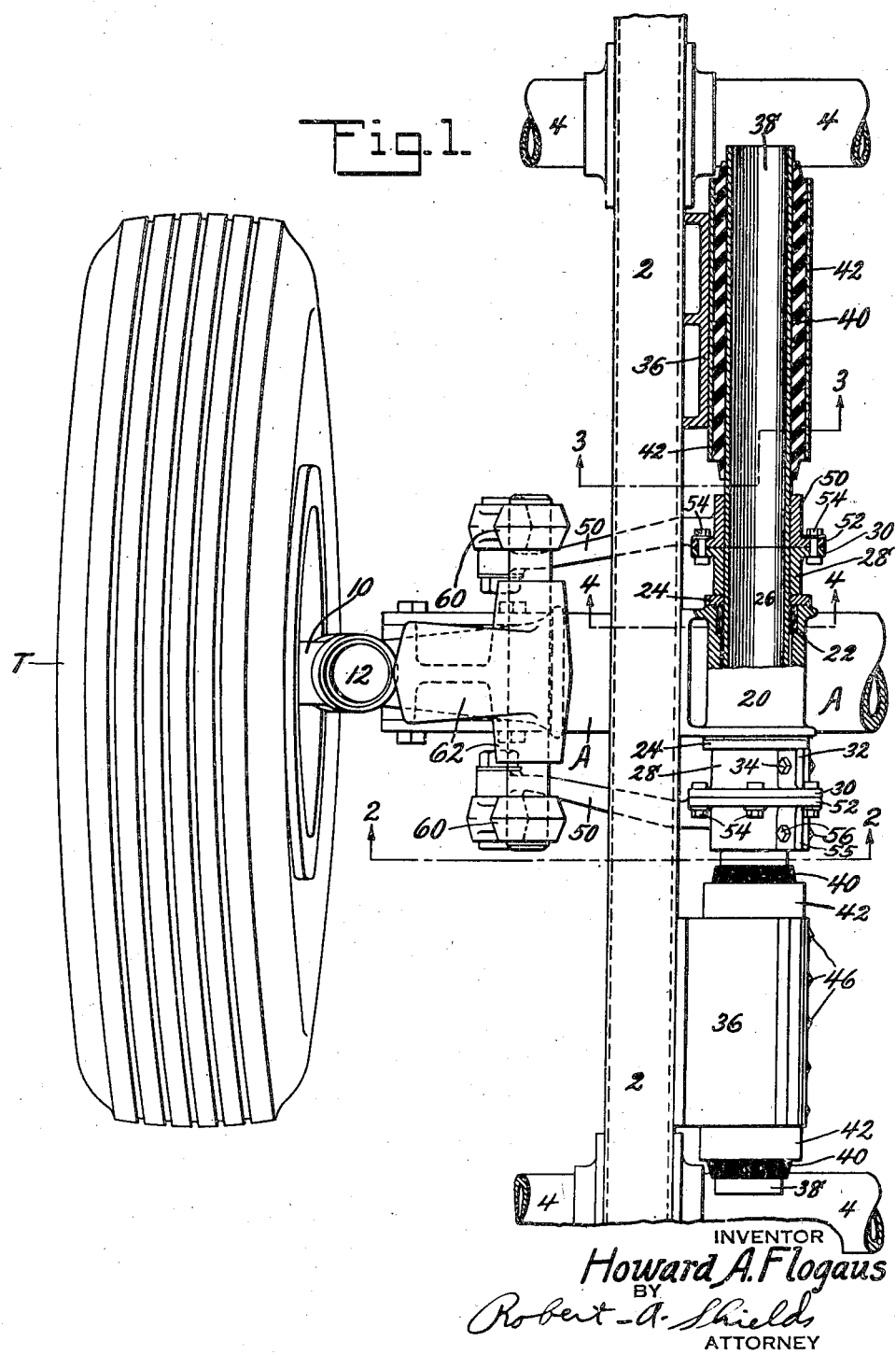
INVENTOR
Howard A. Flogaus
BY
Robert A. Shields
ATTORNEY

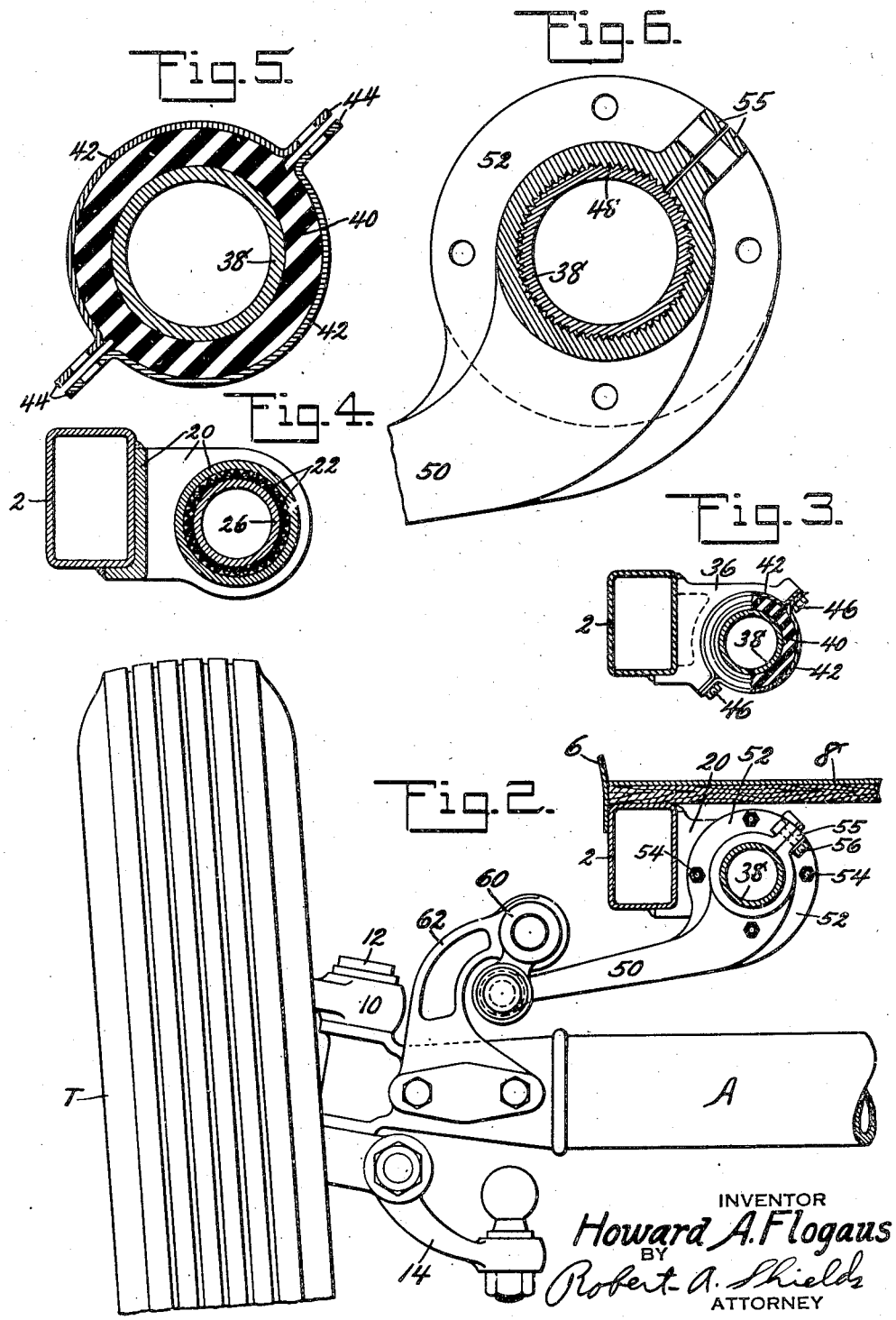

Patented Oct. 5, 1948

2,450,506

UNITED STATES PATENT OFFICE 2,450,506

VEHICLE SUSPENSION

Howard A. Flogaus, Wallingford, Pa., assignor to A C F-Brill Motors Company, New York, N. Y., a corporation of Delaware Application July 27, 1943, Serial No. 496,278

2 Claims. (Cl. 267—21)

This invention relates to vehicle suspension in general and in particular to a suspension for trucks and buses.

Vehicles have in the past been built with longitudinally extending semi-elliptic springs supporting the body on the axles. With the semi-elliptic type of suspension it was impossible to support the vehicle on the axle, particularly at the front end thereof, except at points remote from the wheels. This, of course, required massive axles. Furthermore, with the semi-elliptic spring suspension it was impossible to prevent slight roll of the axle under heavy braking and driving loads. Also, there was a shift in the axle position relative to the frame as the wheel on one side would ride over an obstruction. This roll and shift of the axle not only tended to wear out tires but also increased steering difficulties. It is an object, therefore, of the present invention to provide a resilient spring suspension which will hold the axle rigid against all movements except those in a vertical plane through the axis of the axle.

A further object of the invention is the provision of a vehicle suspension having the parts so arranged as to support the vehicle on the axle closely adjacent to the wheels and irrespective of whether the wheel is of the fixed or steerable type.

A still further object of the invention is the provision of a vehicle suspension having the parts so constructed and arranged as to permit of comparatively rapid and accurate adjustments being made to compensate for any set which may appear in the resilient suspension.

Yet another object of the invention is the provision of a vehicle suspension utilizing rubber acting in shear and connected to the axle adjacent the wheel so that the unsprung weight may be reduced.

These and other objects of the invention will be apparent to persons skilled in the art from a study of the following description and accompanying drawings, in which Figure 1 is a plan view of the improved suspension with parts broken away to better disclose the construction;

Fig. 2 is a sectional view taken substantially on line 2—2 of Fig. 1;

Fig. 3 is a sectional view taken substantially on line 3—3 of Fig. 1;

Fig. 4 is a sectional view taken substantially on line 4—4 of Fig. 1;

Fig. 5 is an enlarged sectional view taken through the elastic mounting unit when detached from the vehicle, while Fig. 6 is an enlarged sectional view showing the manner of adjustment between certain of the supporting elements.

Referring now to the drawings in detail, it will be seen that the suspension has been shown as applied to a vehicle underframe of the road type and in connection with a steerable wheel of the vehicle. It will be obvious that the suspension may be used with other types of vehicles and with other wheels than the steerable wheels. As shown in the drawings, the vehicle side frame 2 is of substantially closed box cross-section and has connected thereto cross ties 4 by means of which the side members on opposite sides of the vehicle are connected together and to parts of the superstructure. The side frame has connected thereto the vehicle side walls 6 (Fig. 2) and supports the vehicle floor 8. The vehicle is adapted to be supported on an axle A which in turn is supported by any suitable wheel arrangement T. In the present case this wheel is shown as of the pneumatic type, but this, of course, is not necessary. Since the wheel arrangement or assembly is of the steerable type it is connected by means of spaced arms 10 and king pin 12 to the axle A and its movements are controlled in any desirable manner, such as by the steering arm 14.

In order to support the vehicle body on the axle and wheel assembly a bearing bracket 20 is welded or otherwise secured to the side frame 2 on the inner side thereof beneath the floor and, in the present case, directly above the axle A. This bearing bracket is provided with spaced races adapted to receive needle bearings 22 longitudinally held in place by means of washers 24 which also serve as thrust washers, as will later be described. A tube 26 extends through the bearing bracket 20 and is rotatably mounted on the needle bearings 22. This tube has its ends provided with fine pitch splines similar to those shown in Fig. 6 and adapted to be engaged by coupling members 28. These coupling members are formed with an inner fine pitched spline and with an outstanding flange 30. The flange and splined parts are cut and flanges 32 are provided and through which a bolt 34 may extend for the purpose of tightening the coupling member onto the ends of the tube 26. The inner ends of the coupling members bear against the washer 24 thereby taking any end thrust and holding the tube 26 against any movement other than pure rotation in the bearing bracket 20.

In order to resiliently support the vehicle, brackets 36 are welded or otherwise secured to the inner side of the vehicle side frame and both fore and aft of the bearing bracket 20 but in spaced relation thereto. The brackets 36 are formed with a semicircular opening, as more clearly shown in Fig. 3, which opening is adapted to receive the resilient unit. The resilient units, as clearly shown in the figures, are formed by an inner tube 38 to which is vulcanized or otherwise secured a cylinder 40 of rubber or other like material. To the outside of the cylinder is vulcanized or otherwise secured semi-circular rings 42, each being provided with outstanding flanges 44 pierced to receive securing means such as tap bolts 46 (Figs. 1 and 3). As clearly shown in Fig. 5, the resilient units are so formed that in their natural condition the flanges 44 are spaced apart a slight amount to the end that when the units are secured to the brackets 36 the bolts 44 will not only hold the units in place, but will move flanges 44 toward each other, thus placing the resilient material of cylinder 40 under compression. This is at present considered necessary to give added life and better spring action to the resilient material forming the cylinder 40. The inner ends of tubes 38 are provided with fine pitch splines 48 (Fig. 6) and these are adapted to engage with and be gripped by corresponding fine internal splines formed on the inner end of radius arms 50. The inner ends of the radius arms are formed with an attaching flange 52 pierced to receive bolts or other securing means 54 extending through flange 52 of the radius arm and flange 30 of the attaching collar previously referred to. The inner ends of the radius arms are split, as clearly shown in Fig. 6, and formed with flanges 55 adapted to receive bolts or other means 56 by means of which the radius arm splines may be compressed upon the splines of the tubes 38. The radius arms extend downwardly beneath the vehicle side frame for attachment to shackles 60 which in turn are pin connected to axle brackets 62 readily secured to the axle closely adjacent to the supporting wheel.

From the preceding detailed description it will be seen that the radius arms cannot move in any direction except a vertical direction since they are connected through the couplings 28 direct to the shaft 26 which is permitted only pure rotational movement. Since the axle is connected to the radius arms by spaced apart shackles, it likewise can move in but a single plane, that is, a vertical plane through the axle. The shackles will, of course, permit some slight side sway between the axle and vehicle but this must be in the vertical plane of the axle. Any relative motion, therefore, between the vehicle and axle will be absorbed by the resilient material of cylinder 40 acting in torsional shear. This is obvious since the semi-cylinders 42 are immovably clamped to the vehicle and the cylinder 40 is vulcanized or otherwise secured to the semi-cylinders and to tube 38, which in turn is splined to the radius arms. Both resilient units must work in unison since after assembly they are to all intents and purposes rigidly connected by means of the couplings 28 and tube 26. In cases where it is necessary to make adjustments in the space between the vehicle frame and axle this may be readily and accurately done by shifting the position of the radius arms on the tubes 38. Very accurate adjustments may be obtained due to the use of the fine pitch splines. After considerable use it may be found that certain of the resilient units have taken a permanent set and this may be compensated for by adjustment of the radius arms on the fine pitch splines of tubes 38. It will be obvious that any longitudinal motion of the axle relative to the body is prevented since the couplings 28 bear against thrust washers 24, held by bearing bracket 20. Further, it will be obvious that there can be no roll of the axle since the radius arms are rigidly connected together by tubes 26. Thus it will be seen that the suspension prevents any motion of the axle in any direction except in a plane through the axle. In the present instance the tubes 26 and 38 are parallel to all surfaces of the box section side frame and accordingly the axle must move normal to the side frame or, in other words, move in a vertical plane provided the side frame is horizontal. Under certain circumstances it may be found desirable to allow movement of the axle in a plane other than normal to the vehicle side frame and this, of course, may be accomplished by tilting the axis of tubes 38 and 26 with respect to the top and bottom walls of the side frame.

While the construction has been described more or less in detail with specific reference to a steerable type of mount, it will be obvious that the suspension may be used with other types of vehicles and with other than steerable wheels. It will also be obvious to persons skilled in the art that various modifications and rearrangements of parts other than those shown and described may be made.

What is claimed is:

1. The combination with a vehicle frame and supporting axle, a bearing bracket secured to the vehicle frame, a cylindrical member mounted in said bearing bracket for rotational movement relative thereto, coupling means fixed on said cylindrical member and acting as thrust collars preventing endwise movement of the cylindrical member relative to said bearing bracket, support brackets secured to the vehicle frame fore and aft of said bearing bracket, resilient units secured to said support brackets and each including cylindrical means disposed substantially in alignment with said first named cylindrical member, radius arms connected to said cylindrical means and also connected to said coupling means and supporting axle to resiliently support the vehicle through torsional shear action of said resilient units.

2. The combination with a vehicle frame and supporting axle, means for restraining undesirable axle movements and mounted on said vehicle frame for pure rotational movement relative thereto, said means having ends located adjacent the axle, radius arms connecting the ends of said means to said supporting axle adjacent one end of the axle and permitting movement of the axle relative to the frame in a plane substantially normal to the rotational axis of said means, and resilient units carried by the vehicle frame fore and aft of said means, said resilient units including parts bonded together by resilient material and one of said parts being connected to said means and rotatable therewith to thereby subject the resilient material of the unit to shearing action during relative movement between said frame and supporting axle.

HOWARD A. FLOGAUS.

REFERENCES CITED

The following references are of record in the file of this patent:

UNITED STATES PATENTS

| Number | Name | Date |
| --- | --- | --- |
| 123,108 | Kieser | Jan. 30, 1872 |
| 2,080,969 | Macbeth | May 18, 1937 |
| 2,092,613 | Olley | Sept. 7, 1937 |
| 2,103,590 | Lefevre | Dec. 28, 1937 |
| 2,149,297 | Knox | Mar. 7, 1939 |
| 2,160,862 | Hickman | June 6, 1939 |
| 2,226,406 | Krotz | Dec. 24, 1940 |
| 2,233,293 | Matthews | Feb. 25, 1941 |
| 2,251,416 | Parker | Aug. 5, 1941 |
| 2,286,609 | Ledwinka | June 16, 1942 |
| 2,330,482 | Fageol | Sept. 28, 1943 |
| 2,345,201 | Krotz | Mar. 28, 1944 |